United States Patent
Zhou et al.

(10) Patent No.: US 9,804,961 B2
(45) Date of Patent: Oct. 31, 2017

(54) FLASH MEMORY FILE SYSTEM AND METHOD USING DIFFERENT TYPES OF STORAGE MEDIA

(71) Applicant: Aupera Technologies, Inc., Burnaby (CA)

(72) Inventors: Zhengning Zhou, Shenzhen (CN); Yu Feng Liao, Surrey (CA)

(73) Assignee: AUPERA TECHNOLOGIES, INC., Burnaby, BC (CA)

( * ) Notice: Subject to any disclaimer, the term of this patent is extended or adjusted under 35 U.S.C. 154(b) by 110 days.

(21) Appl. No.: 14/462,054

(22) Filed: Aug. 18, 2014

(65) Prior Publication Data

US 2015/0269071 A1    Sep. 24, 2015

Related U.S. Application Data

(60) Provisional application No. 61/968,373, filed on Mar. 21, 2014.

(51) Int. Cl.

| | | |
|---|---|---|
| G06F 12/00 | (2006.01) | |
| *G06F 12/02* | (2006.01) | |
| G06F 13/00 | (2006.01) | |
| G06F 13/28 | (2006.01) | |

(52) U.S. Cl.
CPC .. *G06F 12/0246* (2013.01); *G06F 2212/7201* (2013.01); *G06F 2212/7205* (2013.01)

(58) Field of Classification Search
CPC ............ G06F 17/3012; G06F 12/0246; G06F 2212/7201; G06F 2212/7205
See application file for complete search history.

(56) References Cited

U.S. PATENT DOCUMENTS

| | | | |
|---|---|---|---|
| 7,633,799 B2 | 12/2009 | Gorobets | |
| 7,873,619 B1* | 1/2011 | Faibish | G06F 17/30091 |
| | | | 707/705 |
| 8,510,500 B2 | 8/2013 | Moon | |
| 8,533,550 B2 | 9/2013 | Khan | |
| 8,745,319 B2 | 6/2014 | Langlois | |
| 8,843,535 B2* | 9/2014 | Prasad | G06F 17/30079 |
| | | | 707/825 |
| 2002/0069324 A1* | 6/2002 | Gerasimov | G06F 17/30067 |
| | | | 711/114 |
| 2007/0136509 A1* | 6/2007 | Agami | G06F 3/0616 |
| | | | 711/103 |
| 2009/0157756 A1* | 6/2009 | Sanvido | G06F 3/061 |
| 2009/0182957 A1* | 7/2009 | Yashiro | G06F 3/0605 |
| | | | 711/156 |
| 2010/0153616 A1* | 6/2010 | Garratt | G06F 12/0246 |
| | | | 711/6 |
| 2012/0079191 A1* | 3/2012 | Jaquette | H04N 21/231 |
| | | | 711/114 |
| 2012/0155157 A1* | 6/2012 | Oh | G11C 11/1675 |
| | | | 365/158 |
| 2013/0080687 A1 | 3/2013 | Nemazie | |

* cited by examiner

*Primary Examiner* — Mark Giardino, Jr.
(74) *Attorney, Agent, or Firm* — Timothy T. Wang; Ni, Wang & Massand, PLLC

(57) ABSTRACT

A file system for flash memory that stores meta data and user data of a file separately in different types of non-volatile memory. By separating non-user meta data and user data in different types of memory devices, it maximizes the benefits provided by each type of memory devices by storing the proper type of data therein. A memory product managed by such a file system is more competitive than peer products in terms of cost, capacity, endurance and startup time.

5 Claims, 7 Drawing Sheets

PRIOR ART

FLASH MEMORY FILE SYSTEM AND METHOD USING DIFFERENT TYPES OF STORAGE MEDIA

BACKGROUND

The system and method disclosed herein relates to a file management system for a Flash based memory system and more particularly relates to a Flash memory file system using different types of storage media.

File system is the software that controls how data is stored and retrieved from storage media. It includes structure and logic rules used to manage data and information about the data. Without a file system, information placed in a storage area would be one large body of data with no way to tell where one piece of information stops and the next begins. File system organize data as a group of files. Each file includes one or more blocks of actual user data and information describing and identifying the user data.

There are many kinds of file systems in the market. They are different on structure and logic, properties of speed, flexibility, security, size and more. Some file systems have been designed for specific applications. File systems can be used to manage different kinds of storage media. A storage media care use different kinds of storage devices. There are file systems designed for a specific type of storage devices. For example, there are Disk file systems, Optical discs, Flash file systems, and Tape file systems.

A Flash file system is specifically designed in consideration of the special abilities, performance and restrictions of Flash memory devices. Although Disk file system is capable of managing Flash memory devices as the underlying storage media, it is much more advantageous to use a file system specifically designed for a memory product that uses Flash devices as the primary storage media.

There are a few Flash file systems already in the market. Commercially available ones include UBIFS, JFFS2, YAFFS, and LogFS.

There are other file systems that claim to be a flash file system but should be more properly called block device drivers. Examples include TrueFFS and ExtremeFFS. These kinds of file system hide the detailed implementation of error correction, bad block management and wear leveling, and provide a block device like interface. However, it does not have a file system interface. Neither does it manage the meta data and indexing information of files. These limited implementations are out of scope of the inventions disclosed herein.

SUMMARY

A file system for Flash memory disclosed herein stores meta data and user data of a file separately in different types of non-volatile memory. By separating non-user meta data and user data in different types of memory devices, it maximizes the benefits provided by each type of memory devices by storing the proper type of data therein. A memory product managed by such a file system is more competitive than peer products in terms of cost, capacity, endurance and startup time.

DETAILED DESCRIPTION

Figure 1:
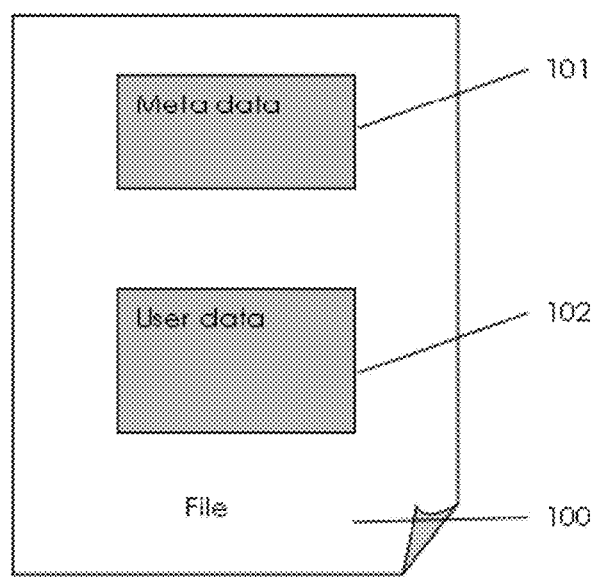
FIG. 1 shows a block diagram of the logical parts of a file.

FIG. 1 shows the logical parts in a typical computer file. File (100) consists of meta data (101) and user data (102).

Meta data (101) is data about data, which is also referred to as non-user data. It includes information typically associated with each file within a file system, including but not limited to:
 a) The length of the user data;
 b) The time when the file was created;
 c) The time when the file was last modified;
 d) The time when the file was last accessed;
 e) The time when file's meta data was last changed;
 f) The time when the file was last backed up;
 g) The file's storage device type;
 h) The file's owner user ID and group ID;
 i) The file's access permissions; and
 j) The file name.

User Data (102) is the actual data that a user stores and uses in a file.

Figure 2:
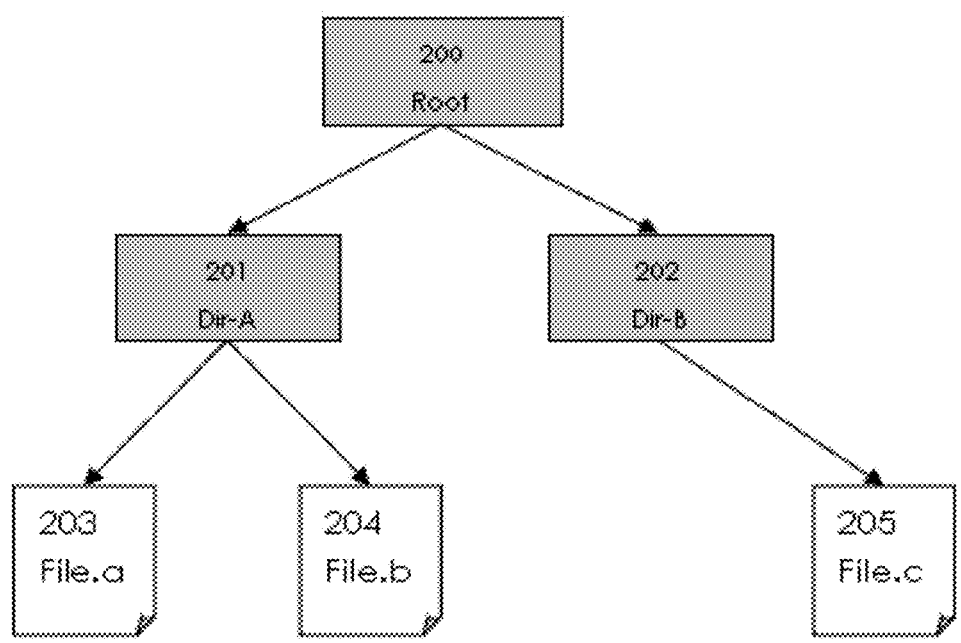
FIG. 2 shows an example of a conventional file system index tree.

FIG. 2 shows an example of a conventional file system index tree or index table. In this example, the Root directory node (200) includes two sub-directory nodes: Dir-A (201) and Dir-B (202). Dir-A (201) contains two file nodes (File.a (203) and File.b (204)). Dir-B (202) contains only one file node (File.c (205)). At the lowest level of an index tree, file nodes 203, 204, and 205 are also called leaf nodes.

Figure 3:
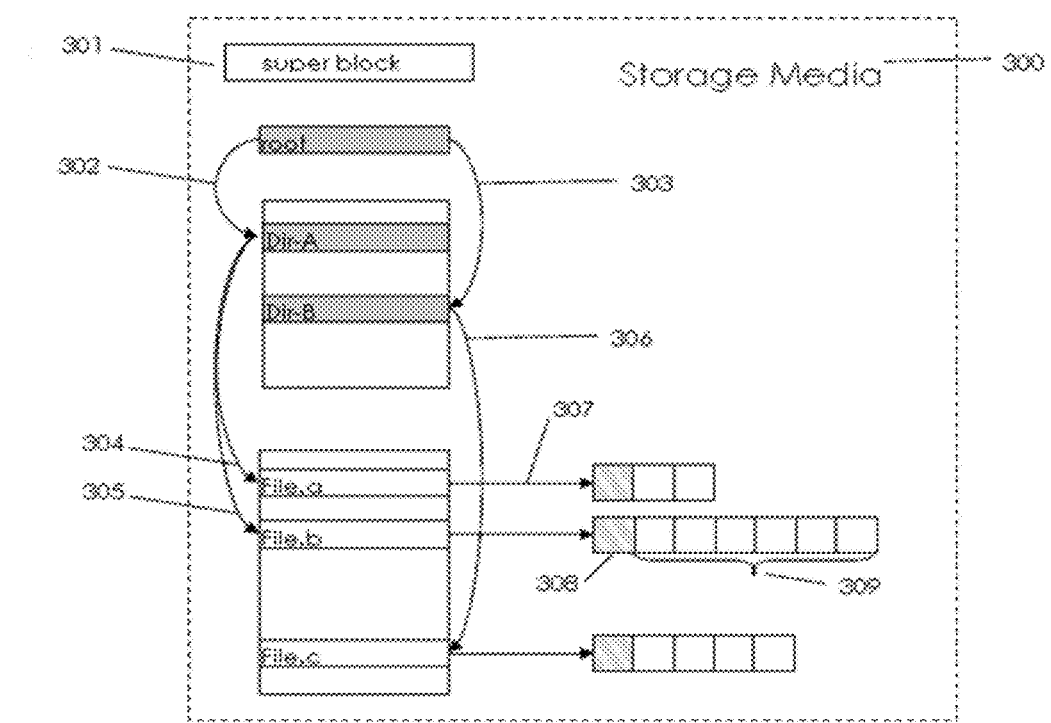
FIG. 3 shows a conventional file system implementation.

FIG. 3 shows a conventional file system implementation in storage media (300). Typically the superblock (301), indexing information (302, 303, 304, 305, 306, and 307), meta data (308), user data (309) are stored and/or need to be synchronized on the same storage media. The storage media can be made of NAND or NOR FLASH storage devices.

The indexing tree or table as shown in FIG. 2 is traditionally implemented as a linked list in storage media (300). Corresponding data structure is created in storage media (300) to store the indexing information (301, 302, 303, 304, 305, 306 and 307).

The file index tree leaf node (e.g. 204) points to a specific file entry (305), which points to the meta data (308) and several blocks of user data (309) on the same storage media.

Figure 4:
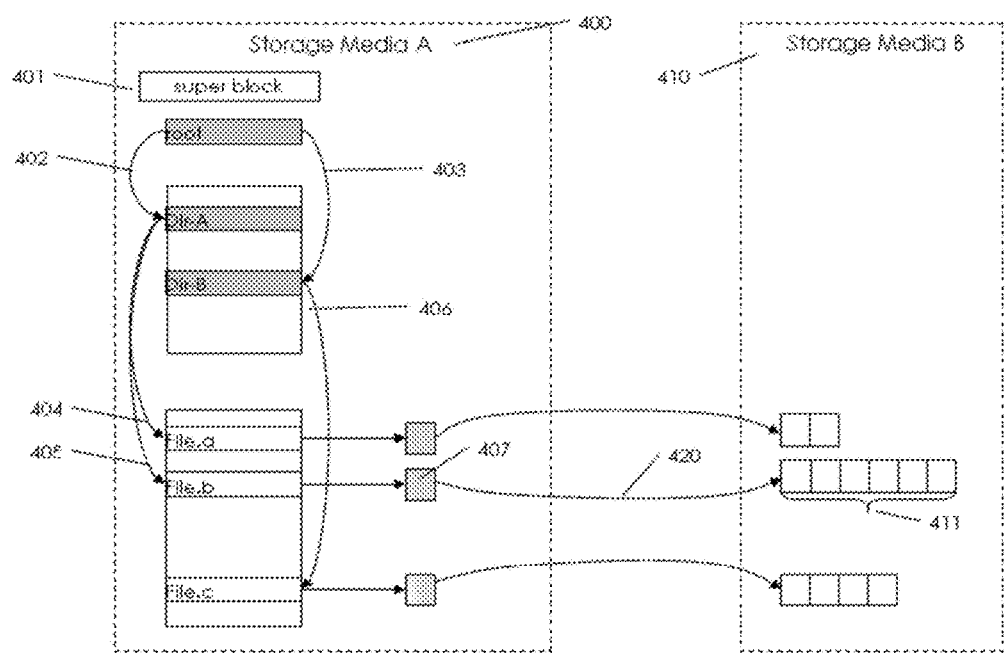
FIG. 4 shows one preferred embodiment of the present inventions.

FIG. 4 shows one preferred embodiment of the present file system. User data (411) is saved in storage media B (410). The non-user data, which includes but not limited to superblock (401), indexing information (402, 403, 404, 405, and 406), and meta data (407), is stored in storage media A (400). Storage media A and B use different types of memory devices.

Storage media A (400) can be made of, but not limited to, MRAM, NOR Flash, SLC Flash.

Storage media B (410) could be made of, but not limited to, eMLC Flash, MLC Flash, TLC Flash, and eMMC card.

Compared to storage media A (400), storage media B(410) are typically made of storage devices with a) higher capacity; b) lower endurance; and c) lower costs in deployment.

Figure 5:
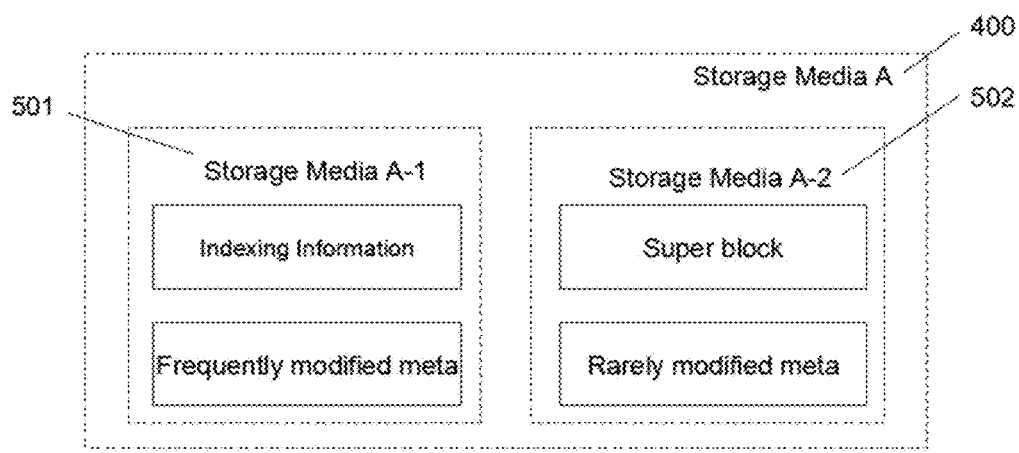
FIG. 5 shows one preferred embodiment where frequently or rarely updated non-user data are stored in different types of storage media.

FIG. 5 shows one preferred embodiment where frequently or rarely updated non-user data are stored in different type of storage media. The non-user data, including superblock, indexing information and meta data, can be further separated and stored in different types of storage media depending on the frequency of data updating. For example, Indexing information (402, 403, 404, 405, 406, and 407) and some frequently modified meta data are stored into media A-1 (501), while superblock (401 and other rarely modified meta data are stored into media A-2 (502).

Figure 6:
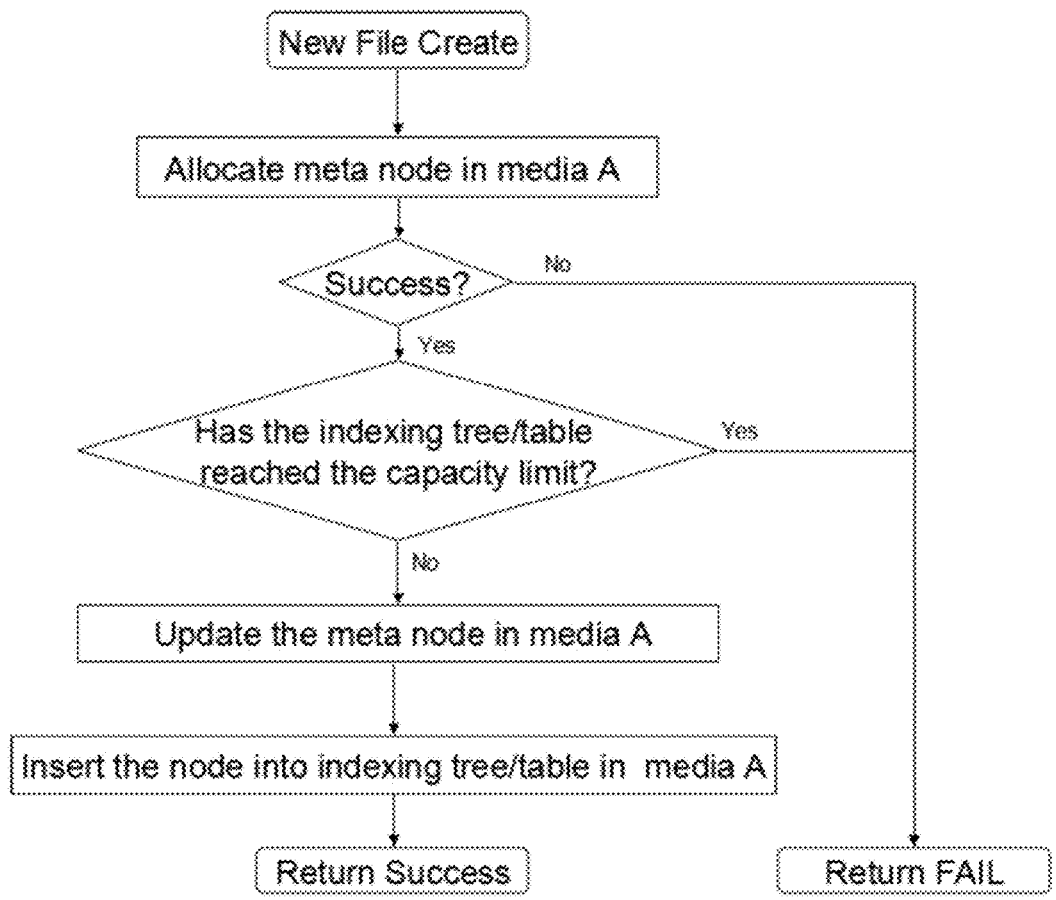
FIG. 6 shows the flow chart of creating a file in one preferred embodiment.
Figure 7:
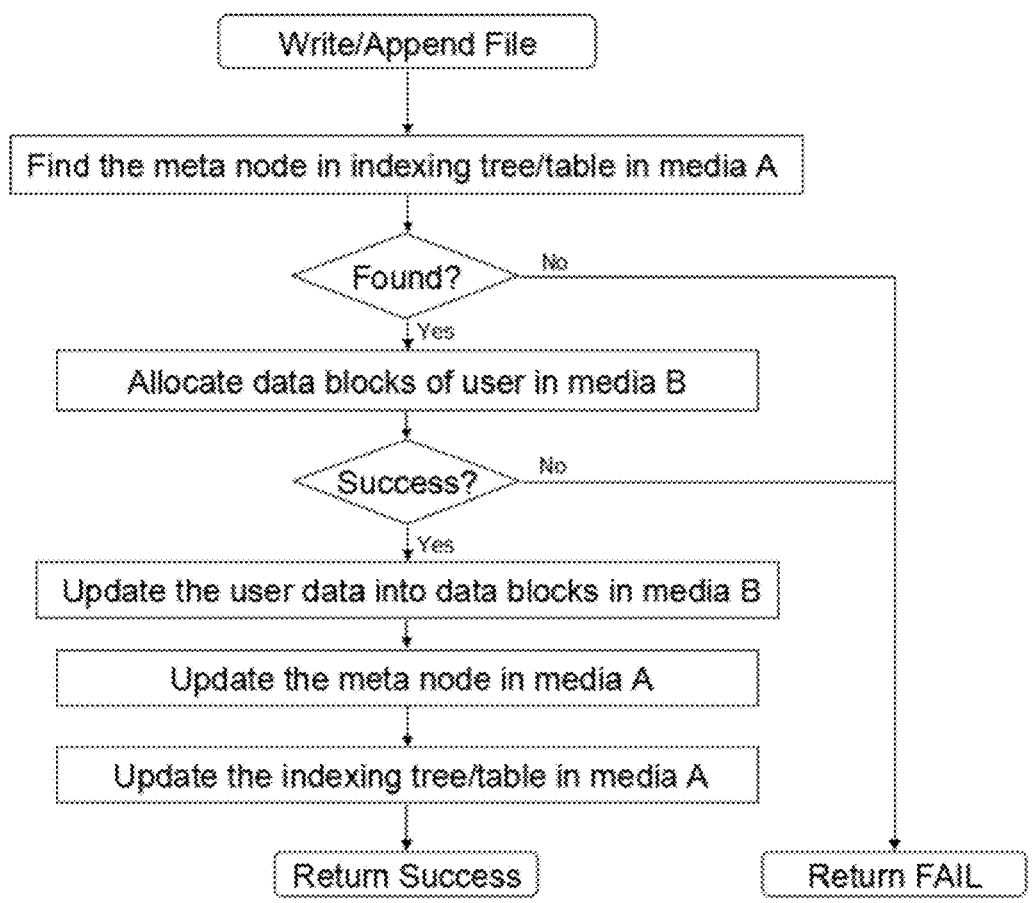
FIG. 7 shows the flow chart of the write/append a file operation in one preferred embodiment.

FIG. 6 shows the flow chart of creating a file in one preferred embodiment. FIG. 7 demonstrate a write/append file operation. Upon the receipt of a request to create a new file, the file system first employs an organizer module that separates incoming data in a file as user data and non-user data. It then uses a write control module that writes non-user data of said data file onto storage media A and user data of said data file onto storage media B. Storage media A and B are made of different types of storage devices. The system first attempts to allocate memory for a meta node in a storage media A. If succeeded, it will inquire the capacity of the indexing tree or table on storage media A to check whether new entry is allowed. The file system will then create and populate data of the meta node using the non-user data of the file. The meta node will also be added to the indexing tree/table in storage media A. After the meta node is created, the file system attempts to allocate data blocks for user data in storage media B. Once succeeded, the user data is saved onto the allocated data blocks in storage media B. The meta node and indexing tree/table in storage media A is also updated with information related to the write operation in storage media B. If it is a write/append operation of an existing file, the write control module will first search and locate the corresponding meta node in the indexing tree or table in storage media A.

Figure 8:
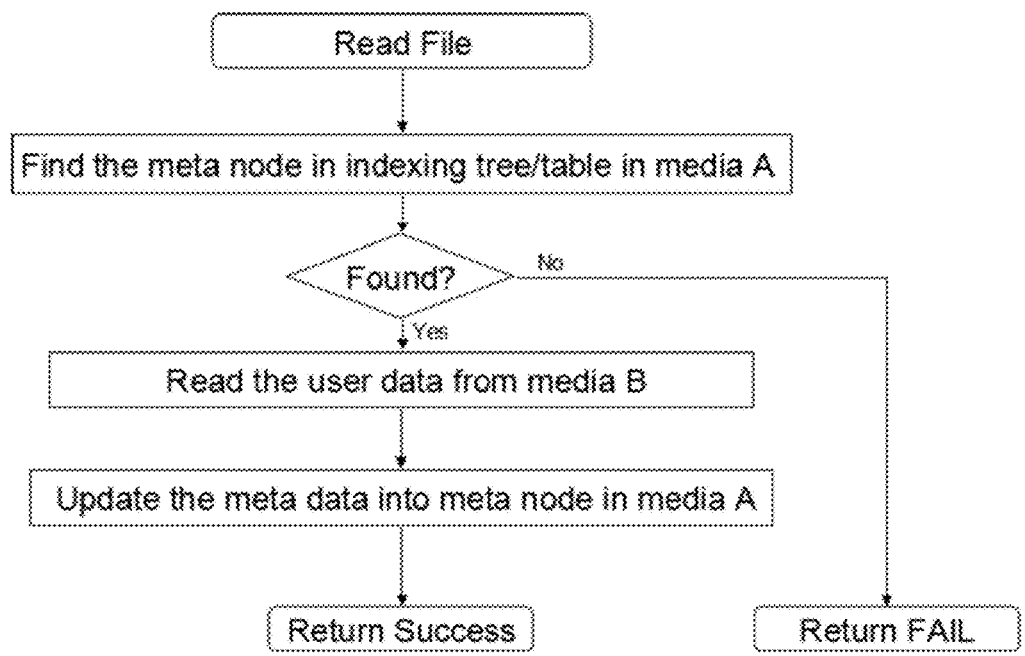
FIG. 8 shows the flow chart of the read a file operation in one preferred embodiment.

FIG. 8 shows an exemplary read a file operation in one preferred embodiment of the system. The file system employs a read control module for handling the read file operations. The system first receives a command to read a file. It searches the meta node of said file in the indexing tree/table in storage media A. Using the index information, it then reads the user data of the file from storage media B. The meta node in storage media A is updated after a successful read operation.

Figure 9:
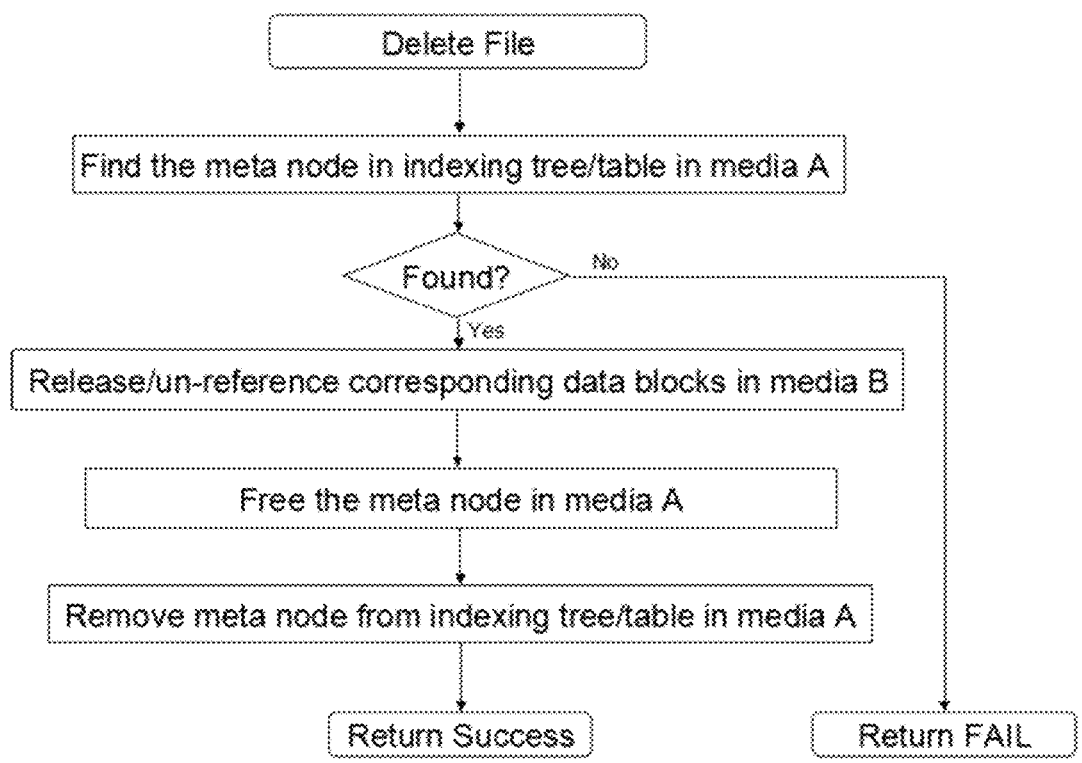
FIG. 9 shows the flow chart of the delete a file operation in one preferred embodiment.

FIG. 9 shows an exemplary delete a file operation in one preferred embodiment of the system. The file system employs a delete control module for handling the delete file operations. The system first receives a command to delete a file. It searches the meta node of said file in the indexing tree/table in storage media A. Using the indexing information, the system releases or un-references the data blocks containing the user data of the file in storage media B. It then deletes the meta node of said file in and removes the meta node from the indexing table in the storage media A.

Although the invention has been described in terms of specific embodiments, it is anticipated that alterations and modifications thereof will no doubt become apparent to those skilled in the art. It is therefore intended that the following claims be interpreted as covering all such alterations and modifications as they fall within the true spirit and scope of the inventions.

What is claimed is:

1. A computer-implemented method operable in a Flash file system for storing and managing data files in different types of storage media comprising:
    creating a meta node in storage media of a first flash type using a portion of a non-user data of a file;
    inserting a portion of said meta node in an indexing table in said storage media of first flash type;
    allocating data blocks for user data of the file in storage media of second flash type;
    writing said user data into allocated data blocks in said storage media of second flash type;
    creating a superblock in storage media of a third flash type using another portion of the non-user data of a file;
    separating non-user data in said meta node based on frequency of updates, said indexing table stored in said storage media of said first flash type, said superblock stored in said storage media of said third flash type;
    inserting another portion of said meta node in a superblock in said storage media of third flash type;
    updating the meta node in said media storage of first flash type;
    updating the indexing table in said media storage of first flash type; and
    wherein said first flash type of storage media is different from said second flash type of storage media and said third flash type of storage media; and
    wherein said first flash type and third flash type of storage media have a higher endurance than said second flash type of storage media.

2. The method of claim 1, wherein said non-user data comprising of indexing information of the user data.

3. The method of claim 1, wherein said non-user data further comprising of the length and storage media type of said user data.

4. The method of claim 1 further comprising the step of writing a superblock data onto said storage media of first flash type.

5. The method of claim 1 further comprising the step of grouping said non-user data into two types of information based on its frequency of update and writing said two types of information respectively into different types of storage media.

* * * * *